(12) United States Patent
Wei et al.

(10) Patent No.: US 8,282,220 B2
(45) Date of Patent: Oct. 9, 2012

(54) STRUCTURE FOR PROJECTOR WITH COLOR SENSOR

(75) Inventors: Tzu-Ming Wei, Jhu-Bei (TW); Wei-Po Hsu, Jhu-Bei (TW)

(73) Assignee: Lumens Digital Optics, Inc. (TW)

( * ) Notice: Subject to any disclaimer, the term of this patent is extended or adjusted under 35 U.S.C. 154(b) by 440 days.

(21) Appl. No.: 12/555,208

(22) Filed: Sep. 8, 2009

(65) Prior Publication Data

US 2010/0060864 A1    Mar. 11, 2010

(30) Foreign Application Priority Data

Sep. 5, 2008    (TW) ................................. 97216138 U

(51) Int. Cl.
| | |
|---|---|
| G03B 21/28 | (2006.01) |
| G03B 21/20 | (2006.01) |
| G03B 21/14 | (2006.01) |
| G02B 27/14 | (2006.01) |
| G02B 26/08 | (2006.01) |
| G06K 9/20 | (2006.01) |

(52) U.S. Cl. ................ 353/81; 353/85; 353/20; 353/84; 353/98; 359/634; 359/223.1; 382/317

(58) Field of Classification Search .................... 353/81, 353/85, 20, 84, 98; 359/634, 223.1; 382/317
See application file for complete search history.

(56) References Cited

U.S. PATENT DOCUMENTS

| | | | |
|---|---|---|---|
| 7,651,227 B2 * | 1/2010 | Penn et al. ..................... 353/102 |
| 2009/0009723 A1 * | 1/2009 | Keller et al. ..................... 353/31 |

* cited by examiner

*Primary Examiner* — Georgia Y Epps
*Assistant Examiner* — Magda Cruz
(74) *Attorney, Agent, or Firm* — Allen, Dyer, Doppelt, Milbrath & Gilchrist, P.A.

(57) ABSTRACT

A projector with a color sensor module is provided. The projector includes a light source providing a light, a prism device refracting the light, a reflecting device reflecting the light refracted by the prism device, an optical lens receiving the light reflected by the reflecting device and forming a first light path between the optical lens and the reflecting device, and a color sensor module disposed on a second light path and comprising a light inlet receiving the light reflected toward the second light path by the reflecting device.

20 Claims, 4 Drawing Sheets

STRUCTURE FOR PROJECTOR WITH COLOR SENSOR

FIELD OF THE INVENTION

The present invention relates to a projector, and more particular to a industrial projector having a function for sensing light.

BACKGROUND OF THE INVENTION

FIG. 1 shows of a conventional light path of an industrial DLP projector. The projector 1 has a light source 10, a TIR Prism 11, a DMD 12, and a optical lens 13. FIG. 1 shows an interior light marching between those elements.

For achieving the function of light projection, after the light L being emitted by the light source 10, the light L is refracted by the first prism 111 toward the DMD 12, and then refracted by the second prism 112 toward the optical lens 13. Finally, the light L is projected by the optical lens 13.

Such a conventional projector as the projector 1 shown in FIG. 1 has no color sensor device therein for sensing/detecting the light L. Therefore, the projector 1 is unable to sense the intensity and color of the light L and unable to adjust the light projection. The function of light projection of the projector 1 is limited and cannot achieve the various demands of the market.

According to the above description, a novel sensing projector is provided, and the present invention is able to overcome the mentioned drawbacks in the prior art.

SUMMARY OF THE INVENTION

Therefore, the applicant provides a projector having a light sensing function achieved by adding a color sensor device into a conventional projector. The color sensor device senses the light which is about to be projected. The intensity or color of the light can be adjusted according to the demands of a user. Furthermore, the heat dissipation and the stray light reduction are considerable to the structure of the color sensor device.

According to one aspect of the present invention, a projector with a color sensor module is provided. The projector includes a light source providing a light; a prism device refracting the light, a reflecting device reflecting the light refracted by the prism device, an optical lens receiving the light reflected by the reflecting device and forming a first light path between the optical lens and the reflecting device, and a color sensor module disposed on a second light path and comprising a light inlet receiving the light reflected toward the second light path by the reflecting device.

Preferably, the prism device is a total internal reflection (TIR) prism having at least one prism.

Preferably, the reflecting device is a digital micromirror device comprising plural micromirrors.

Preferably, the optical lens projects an image formed by the reflected light.

Preferably, the light inlet and the second light path have respective sectional areas, and the sectional area of the inlet is smaller than that of the second light path.

Preferably, the color sensor further comprises: a metal shell having the light inlet, a neutral density filter disposed on the light inlet and filtering the light passing through the inlet, and a color sensor disposed inside the metal shell, receiving the light filtered by the neutral filter and adjusting a intensity and a color of a projection from the projector by measuring the light filtered by the neutral filter.

Preferably, the neutral filter has a normal, and the light on the second light path and the normal have an included angle larger than zero degree and smaller than 90 degrees.

Preferably, the projector further comprising an outer metal cover connected to the metal shell.

Preferably, the outer metal cover and the metal shell are made of an aluminum-containing material.

According to another aspect of the present invention, a projector with a color sensor module is provided. The projector includes a light source providing a light; a first unit refracting the light, a second unit reflecting the light refracted by the first unit, an third unit receiving the light reflected by the second unit and forming a first light path between the third unit and the second unit, and a color sensor module disposed on a second light path and measuring the light reflected to the second light path by the second unit.

Preferably, the first unit is a TIR prism having at least one prism.

Preferably, the second unit is a digital micromirror device comprises plural micromirrors.

Preferably, the third unit is an optical lens projects an image formed by the reflected light.

Preferably, the color sensor measures the light while the digital micromirror device is acting.

According to a further aspect of the present invention, a color sensor device for a projector projecting a projection is provided. The color sensor device includes an outer shell with a light opening receiving a light existing in the projector, a light filter disposed on the light opening and filtering the received light, and a sensor unit disposed inside the outer shell and sensing and adjusting at least one of a intensity and a color of the projection.

Preferably, the outer shell is a metal shell and the projector comprises an outer metal cover joining the metal shell.

Preferably, the outer metal cover and the metal shell are made of an aluminum-containing material.

Preferably, the light opening and the received light have respective sectional areas, and the sectional area of the light opening is smaller than that of the received light.

Preferably, the light filter is a neutral density filter having a normal, and the light and the normal have an included angle larger than zero degree and smaller than 90 degrees.

Preferably, the sensor unit is a color sensor sensing and adjusting at least one of the intensity and the color of the received light via measuring the light filtered by the light filter.

The above contents and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purposes of illustration and description only; it is not intended to be exhaustive or to be limited to the precise form disclosed.

Figure 1:
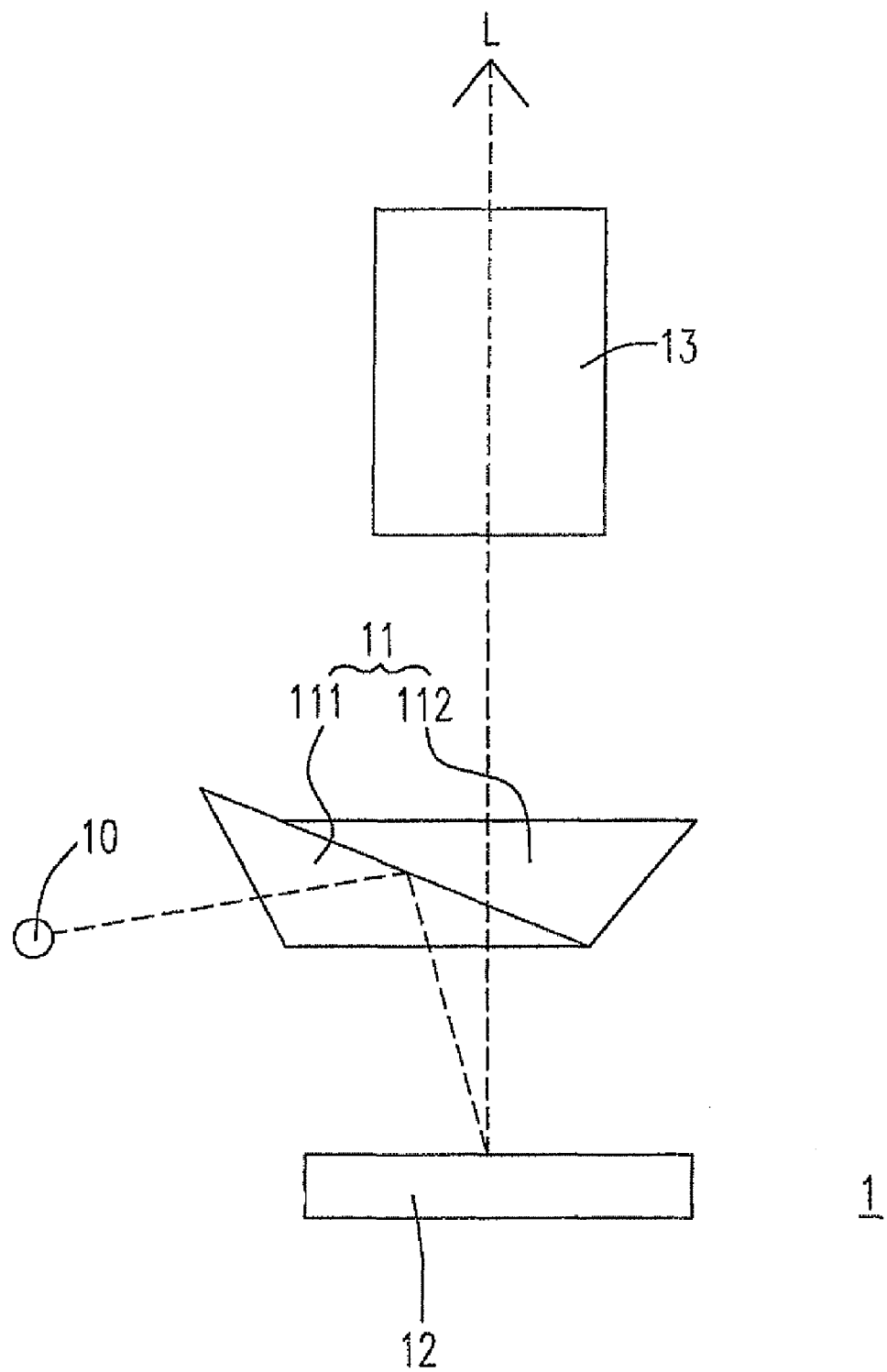
FIG. 1 is a schematic view of a conventional light path of an industrial DLP projector.
Figure 2:
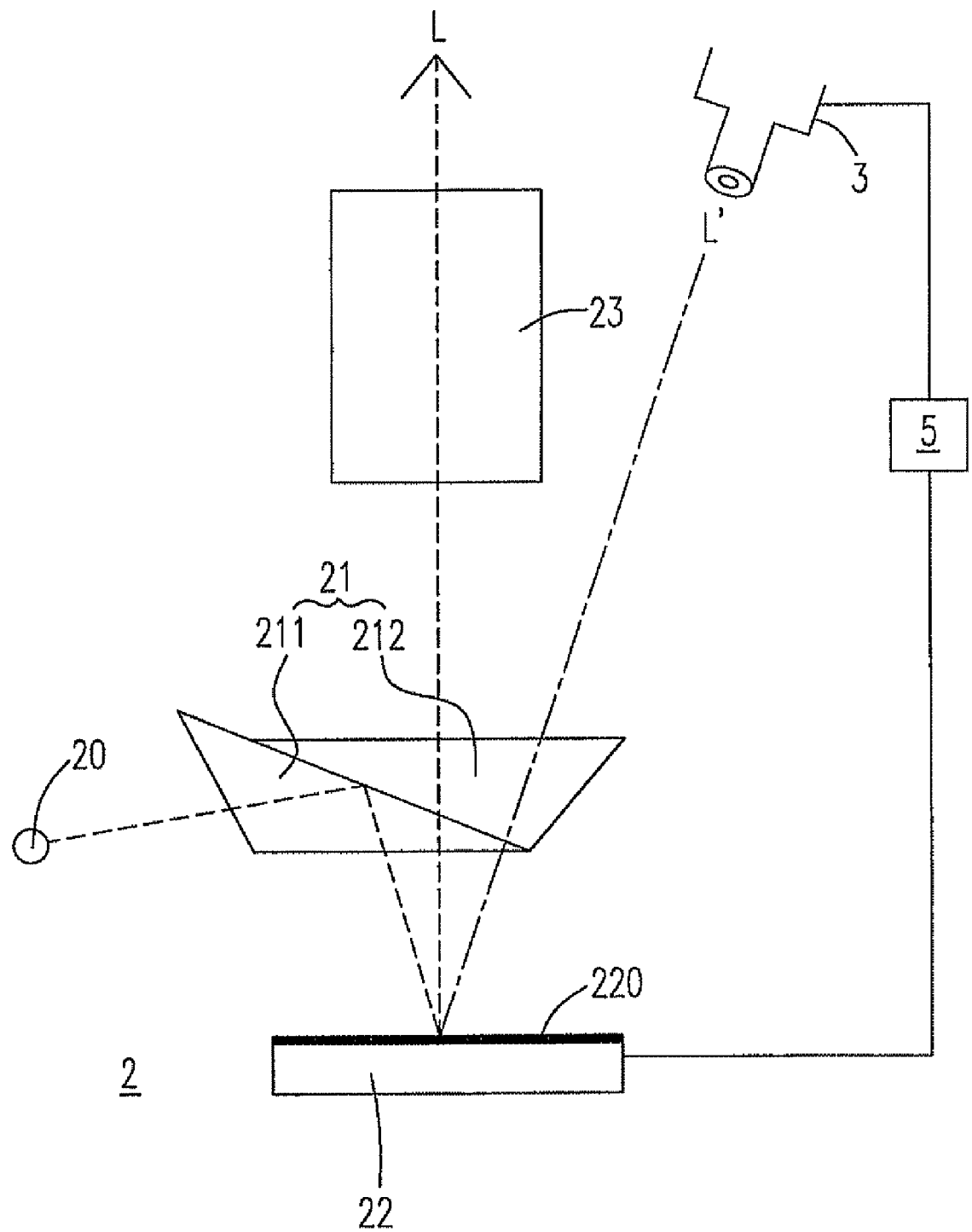
FIG. 2 is a schematic view of a light path of a projector with a color sensor module according to a preferred embodiment of the present invention.

Please refer to FIG. 2, which shows a schematic view of a light path of a projector with a color sensor module according to a preferred embodiment of the present invention. In FIG. 2, the projector 2 is constructed of a light source 20, a TIR prism 21, a DMD 22, an optical lens 23, and a color sensor module 3. Furthermore in FIG. 2, a control unit 5 electrically connects to the color sensor module 3 and the DMD 22.

The function of light projection of the present invention is identical to the conventional one. After the light L emitted by the light source 10, the light L is refracted by the first prism 211 toward the DMD 22, and then refracted by the second prism 212 toward the optical lens 23. Finally, the light L is projected by the optical lens 13. However, for the purpose of sensing the intensity and the color of the light L and adjusting the light projection, the present invention includes a color sensor module 3 disposed on a second light path which is beyond the first light path appeared between the DMD 22 and the optical lens 23. The color sensor module 3 senses the intensity and the color of the light L between the DMD 22 and the optical lens 23.

As shown in FIG. 2, the surface of the DMD 22 is constructed of a plurality of micromirrors 220, so, when the DMD 22 is in off-state, the light L from the first prism 211 is reflected to the color sensor module 3 on the second light path in an extremely short time. The color sensor module 3 senses the intensity and the color of the light L' and creates a data thereof. Then the projection output is adjusted based on the data. Therefore, the status of the light L' represents that of the light L in a specific ratio. For example, if the data shows that the light L' is too bright, the color sensor module 3 informs the control unit 5 to Dim the light reflected from the DMD 22, and vice versa.

Figure 3:
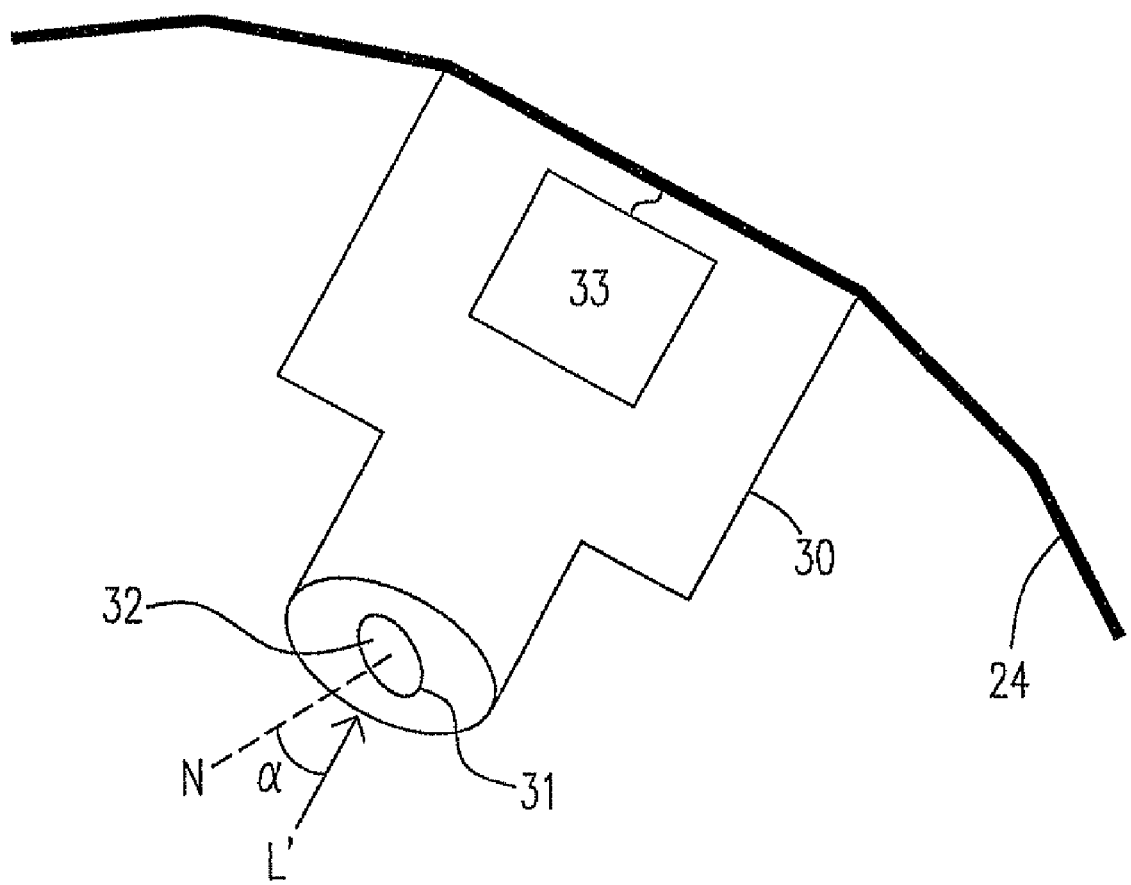
FIG. 3 is a schematic view of an arrangement of a color sensor module according to a preferred embodiment of the present invention.

Please refer to FIG. 3, which shows a schematic view of an arrangement of a color sensor module according to a preferred embodiment of the present invention. The color sensor module 3 is constructed of an outer shell (a metal shell, for example) 30, a neutral density filter (ND filter) 32, and a color sensor 33. The outer shell 30 has a light inlet 31 and the ND filter 32 is disposed across the light inlet 31 for filtering the light L' therethrough. The intensity and the color of the light L' filtered by the ND filter 32 are measured by the color sensor 33 for creating the data of the intensity and the color of the light L'. The light output by the projector 2 is adjusted based on the data.

Because the light L' hits the color sensor module 3 and will cause high temperature rise of color sensor module 3, the color sensor module 3 has several structural improvements for processing the light L' and improving the heat dissipation effects. First of all, as shown in FIG. 3, the outer shell 30 of the color sensor module 3 is connected to the outer metal cover 24 of the projector 2 and is made of a metal material. Because the outer metal cover 24 and the outer shell 30 are made from high heat dissipation factor material, such as aluminum, the structural connecting relationship can obviously increases the heat dissipation efficiency of the color sensor module 3.

Moreover, for reducing the amount of the light L' projected to the color sensor module 3, the sectional area of the light inlet 31 is smaller than the sectional area of the light L' for obtaining a portion of the amount of the light L'. The arrow and the dot-line are just for representing the direction of the light L'. In practice, the section area of the light L' is larger than that of the light inlet 31.

Finally, for increasing the filtering efficiency of the ND filter 32 in filtering the light L', the present invention has a special design for the projection angle of the light L' projecting through the ND filter 32. As shown in FIG. 3, according to the design of the outer shell 30, the degree α between a normal N of the ND filter 32 and the light L' on the second light path is larger than zero degree and smaller than 90 degrees. Therefore, the light L' is not projected into the ND filter 32 in a right angle and the amount of the light L' projected onto the color sensor module 3 is reduced. So, the temperature rise of the color sensor module 3 is decreased.

Figure 4:
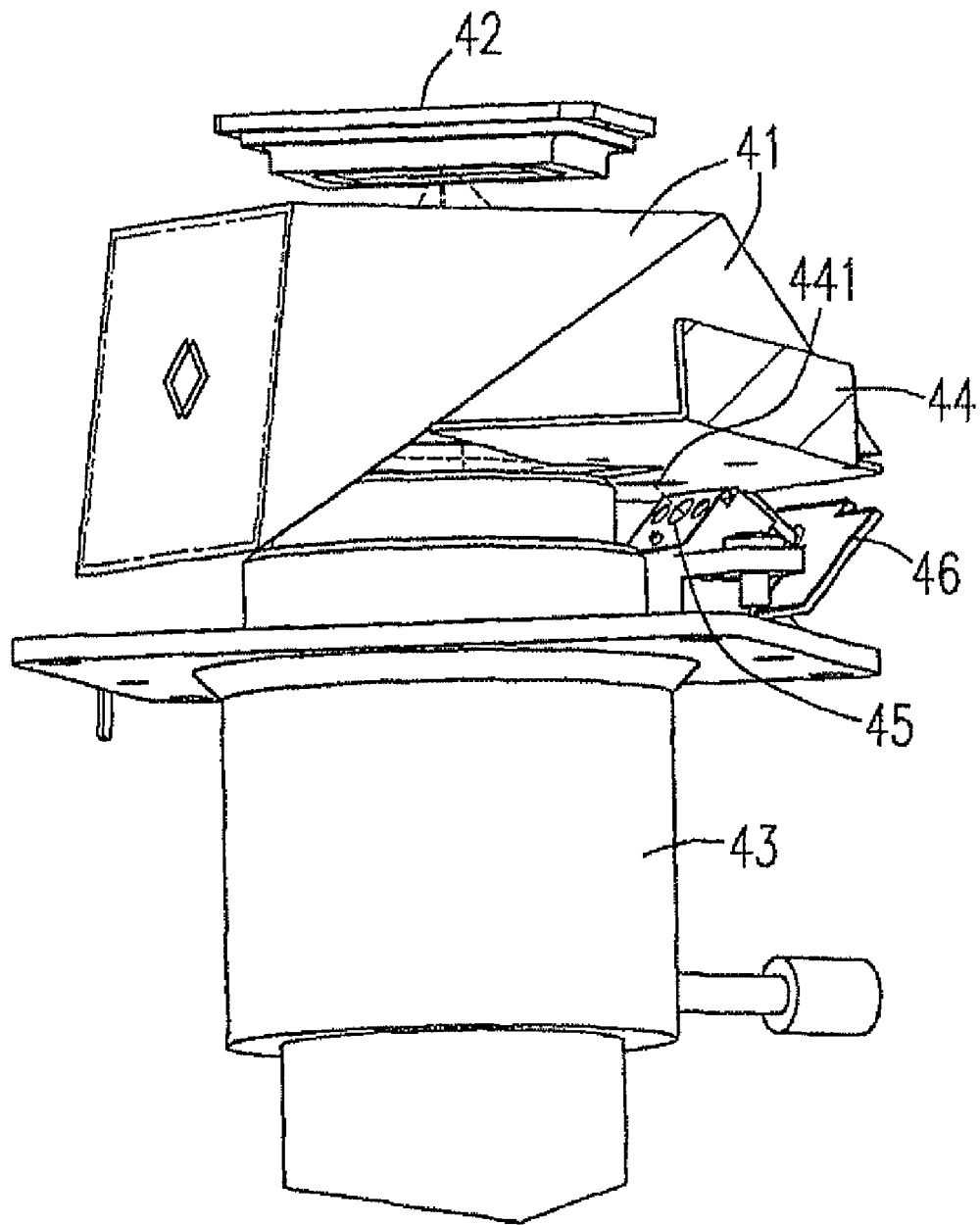
FIG. 4 is a schematic exterior view of the projector with a color sensor module according to a preferred embodiment of the present invention.

Please refer to FIG. 4, which is a schematic exterior view of the projector with color sensor according to a preferred embodiment of the present invention. The projector 4 is upside-down of that of FIG. 2. As shown in FIG. 4, the projector 4 includes a TIR prism 41, a DMD 42, an optical lens 43, and a color sensor 46. Besides, a light shade 44 is further disposed adjacent to the color sensor 46.

According to FIG. 4, the light L' reflected by the DMD 42 passes through the through hole 441 on the light shade 44 at first, and then into the light inlet 45. Finally, the light L' is sensed and analyzed by the color sensor 46 for adjusting the intensity and the color of the light which is to be about to be projected by the optical lens 43 by the projector 4.

According to all descriptions mentioned above, the present invention is to add a color sensor in the conventional projector. The color sensor senses the original light projection off light. The intensity and the color of the light projected by the projector are adjusted according to the results from the color sensor. Furthermore, several designs for assisting heat dissipation and light shading are provided to increase the high temperature tolerance of the color sensor.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A projector with color sensor, comprising:
   a light source providing a light;
   a prism device refracting the light;
   a reflecting device reflecting the light refracted by the prism device;
   an optical lens receiving the light reflected by the reflecting device and forming a first light path between the optical lens and the reflecting device; and
   a color sensor disposed on a second light path and comprising a light inlet receiving the light reflected toward the second light by the reflecting device.

2. The projector as claimed in claim 1, wherein the prism device is a total internal reflection (TIR) prism having at least one prism.

3. The projector as claimed in claim 1, wherein the reflecting device is a digital micromirror device (DMD) comprising plural micromirrors.

4. The projector as claimed in claim 1, wherein the optical lens projects an image formed by the reflected light.

5. The projector as claimed in claim 1, wherein the light inlet and the second light path have respective sectional areas, and the sectional area of the inlet is smaller than that of the second light path.

6. The projector as claimed in claim 1, wherein the color sensor further comprises:

a metal shell having the light inlet;

a neutral density filter disposed on the light inlet and filtering the light passing through the inlet; and a color sensor disposed inside the metal shell, receiving the light filtered by the neutral filter and adjusting the intensity and the color of a projection from the projector by measuring the light filtered by the neutral filter.

7. The projector as claimed in claim 6, wherein the neutral filter has a normal, and the light on the second light path and the normal have an included angle larger than zero degree and smaller than 90 degrees.

8. The projector as claimed in claim 6 further comprising an outer metal cover connected to the metal shell.

9. The projector as claimed in claim 8, wherein the outer metal cover and the metal shell are made of an aluminum-containing material.

10. A projector with color sensor, comprising:

a light source providing a light;

a first unit refracting the light;

a second unit reflecting the light refracted by the first unit;

an third unit receiving the light reflected by the second unit and forming a first light path between the third unit and the second unit; and a color sensor disposed on a second light path and measuring the light reflected to the second light path by the second unit.

11. The projector as claimed in claim 10, wherein the first unit is a TIR prism having at least one prism.

12. The projector as claimed in claim 10, wherein the second unit is a digital micromirror device (DMD) comprises plural micromirrors.

13. The projector as claimed in claim 10, wherein the third unit is an optical lens projects an image formed by the reflected light.

14. The projector as claimed in claim 10, wherein the color sensor measures the light while the digital micromirror device (DMD) is in off-state.

15. A color sensor module device for a projector comprising:

an outer shell with a light opening receiving a light existing in the projector;

a light filter disposed on the light opening and filtering the received light; and a sensor unit disposed inside the outer shell and sensing and adjusting at least one of the intensity and the color of the projection.

16. The device as claimed in claim 15, wherein the outer shell is a metal shell and the projector comprises an outer metal cover joining the metal shell.

17. The device as claimed in claim 16, wherein the outer metal cover and the metal shell are made of an aluminum-containing material.

18. The device as claimed in claim 15, wherein the light opening and the received light have respective sectional areas, and the sectional area of the light opening is smaller than that of the received light.

19. The device as claimed in claim 15, wherein the light filter is a neutral density filter having a normal, and the light and the normal have an included angle larger than zero degree and smaller than 90 degrees.

20. The device as claimed in claim 15, wherein the sensor unit is a color sensor sensing and adjusting at least one of the intensity and the color of the received light via measuring the light filtered by the light filter.

* * * * *